Figure 1:
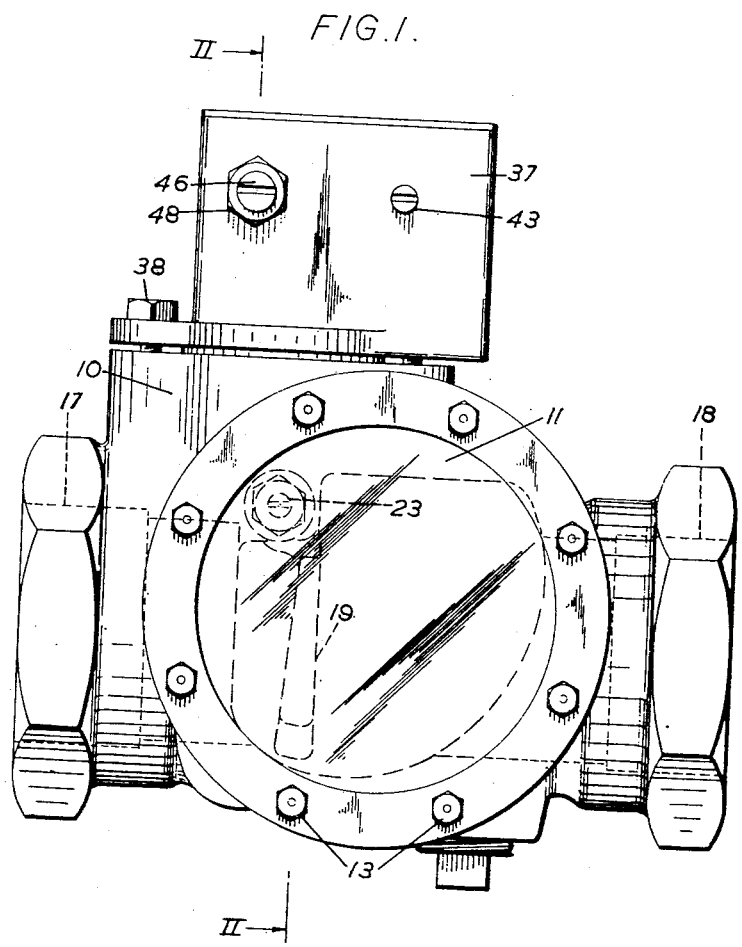

Aug. 24, 1954

F. SMITH 2,687,457

FLUID FLOW INDICATOR

Filed March 14, 1951

2 Sheets-Sheet 1

Inventor
FRANK SMITH

By
Emery, Holcombe & Blair
Attorneys

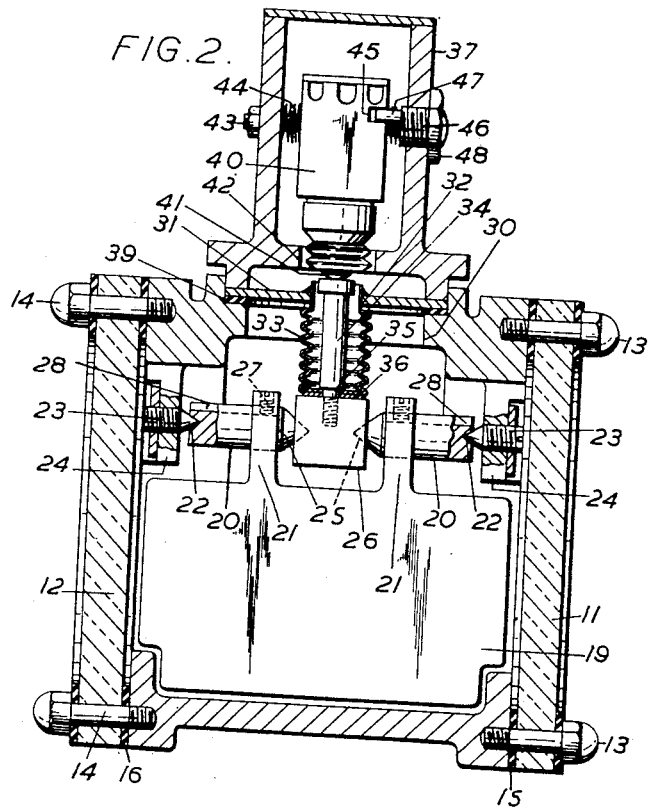
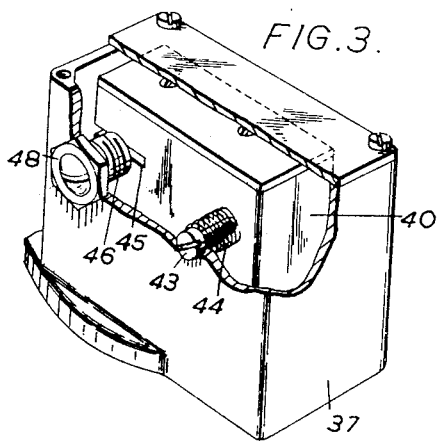
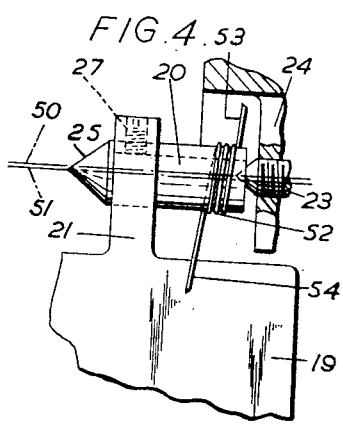

Patented Aug. 24, 1954

UNITED STATES PATENT OFFICE 2,687,457

FLUID FLOW INDICATOR

Frank Smith, Stockport, England, assignor to F. Bamford and Company Limited, Stockport, England, a British company Application March 14, 1951, Serial No. 215,420

5 Claims. (Cl. 200—81.9)

In many fluid circulating systems, for example the cooling and/or lubricant systems of large internal combustion engines, it is important that some indication or alarm be given when the rate of flow of fluid in the system falls below a predetermined rate, as might occur owing to failure of a pump, or as a result of damage to some other part of the system.

For this purpose it has previously been proposed to provide a casing adapted to form a part of a closed conduit for the fluid concerned and to have a primary member within the casing capable of angular movement in response to the flow conditions in the conduit, a secondary member being supported upon, and sealed by, a diaphragm which permits endwise displacement of the secondary member by the primary member through a helical or screw and nut connection. The secondary member is arranged to actuate a switch controlling the energisation of electrical indicating, recording or signalling means.

The present invention is designed to provide a device of this kind having a new or improved connection between the primary and secondary members. A further object is to provide readily accessible means for adjusting the device to vary the setting for the pre-determined rate of flow at which the indicating, recording or signalling means will be operated.

Another object is to provide a fluid flow indicator in which the angular movement of the primary member is transmitted to the secondary member by an eccentric member associated with the primary member. The secondary member therefore, operates in the same way as a connecting rod engaged with a crank or eccentric pin, and the free end of the secondary member will receive substantially longitudinal movements for causing actuation of indicating, recording or signalling means.

Means are provided for adjusting the device so that the switch will be actuated at any desired predetermined rate of flow of the fluid. It is, however, desirable that such adjusting means are readily accessible, preferably from the exterior of the device.

A still further object is to provide means whereby the switch is pivotally mounted and mechanism is provided for rocking the switch about its pivot so as to move the switch actuating member towards or away from the secondary member of the device. The adjusting mechanism may comprise a spindle rotatably mounted in a wall of the casing and extending therethrough, the inner end of the spindle having an eccentric pin adapted to engage in a slot in the switch so that by rotating the spindle, the switch will be rocked about its pivotal mounting. Any suitable means may be provided for locking the spindle to the casing after the switch has been adjusted.

For a more complete understanding of the invention, reference may be made to the constructional example illustrated in the accompanying drawings in which:

Figure 1 is a side elevation of a fluid flow indicator device constructed according to the invention, Figure 2 is a sectional elevation on the line II—II of Figure 1 and in the direction of the arrows, Figure 3 is a perspective view of the switch housing part of which is shown broken away to more clearly show the adjustable mounting for the switch, and Figure 4 is a detail view of the pivotal mounting for the primary member or vane but also including a modification whereby the vane is spring-biased.

Referring to the drawings, the device comprises a hollow casing 10 which has circular openings at each side and these openings are closed by transparent windows 11 and 11 which may be made of glass or any other material according to the liquid which is to be passed through the casing. The windows 11, 12 are secured to the casing by means of the studs 13, 14 and sealing washers 15, 16 are provided to ensure fluid tight joints. An inlet passage 17 at one end of the casing communicates with the interior thereof and similarly, an outlet passage 18 is provided at the other end of the casing. Both these passages may be screw threaded at their outer ends to enable couplings to be connected thereto. The primary member is in the form of a flap or vane 19 arranged transversely within the casing so that it hangs downwardly from a pivotal mounting into the path to be followed by the fluid passing therethrough. The pivotal mounting for the flap or vane 19 comprises two pivot pins 20 each of which passes through one of a pair of lugs 21 on the flap or vane 19. The outer end of each pivot pin 20 has a conical recess or dimple 22 for engagement by the pointed end of one of a pair of pointed pivot pins 23. The pointed pivot pins 23 are screw threaded and are engaged in screw threaded holes in lugs 24 on interior walls of the casing 10. The inner end of each pivot pin 20 is pointed as at 25 and engages in one of a pair of conical recesses or dimples formed in opposite ends of a block 26. The flap or vane 19 is prevented from rotating relatively to the pivot pins 20 by means of the grub screws 27 passing through the lugs 21 to engage in longitudinal grooves 28 in the pivot pins 20. It will be seen, therefore, that the flap or vane 19 will be permitted to move angularly about the common axis of the two pointed pivot pins 23. The axis of the pointed ends 25 of the pivot pins 20 is displaced radially relatively to the axis of the pivot pin 23, see particularly Figure 4. If therefore, the block 26 is prevented from rotating then it will be given a small gyratory movement when the flap or vane 19 is rocked about its pivotal mounting.

An aperture 30 is formed in the upper surface of the casing 10 and this aperture is closed by a disc 31 which has a central aperture 32. One end of a metal bellows 33 is sealed around this central aperture 31, the other end of the metal bellows being secured to the upper surface of the block 26. An operating rod 34, has screw threads at its lower end by means of which it is secured in the block 26, and it has a shoulder 35 for engagement with a disc 36 between which and the block 26 the lower end of the metal bellows is clamped. The metal bellows, therefore, serves to prevent rotation of the block 26 and also serves to seal the aperture 32 in the disc 31, whilst permitting movement of the rod 34. A switch casing 37 is secured around the upper end of the aperture 30 by means of studs 38, only one of which can be seen in Figure 1. The lower end of the switch 37 serves to retain the disc 31 over the aperture 30 and a sealing ring 39 is provided to ensure a fluid tight joint.

A switch 40 is mounted in the switch casing 37, and it has an actuating member 41 which projects through an opening 42 in the switch casing for engagement with the operating rod 34. The switch used in this construction is preferably of the "Micro" type characterised in that its actuating member 41 requires a very small movement, for example only a few thousandths of an inch, for closing or opening the switch contacts, not shown. The switch 40 is mounted between two pivot pins 43 passing through opposite sides of the switch casing 37, and springs 44 surrounding the pivot pins 43 engage between the opposite sides of the switch and the inner walls of the switch casing so as to maintain the switch substantially central therein. This pivotal mounting for the switch, as shown in Figure 3, is disposed adjacent to one end of the switch, and the other end of the switch has a longitudinally disposed slot or groove 44. A switch adjusting member 46 is rotatably mounted in a wall of the switch casing adjacent to the slot or groove 45 in the switch. In the construction illustrated, the switch adjusting member is in the form of a screw engaging in a screw threaded hole in the switch casing. The inner end of the screw 46 has an eccentric pin 47 which engages in the slot or groove 45. Consequently, by rotating the screw 46 the eccentric pin 47 will rock the switch 40 about the pivot pins 43. Although during such rotation of the screw 46 a certain amount of longitudinal movement will be given to the screw, this will be relatively small as it will never be necessary to rotate the screw more than half a revolution, and the depth of the slot or groove 45 will be such as to accommodate this small movement. A nut 48 is threaded on the outer end of the screw to enable the latter to be locked to the switch casing after adjustment.

In operation, the device is to be interposed in a conduit forming part of the fluid system with which the device is to be used so that fluid will flow through the inlet passage 17, through the casing 10, and out through the outlet passage 18. The pivotal mounting for the flap or vane 19 is such that should there be no fluid flowing through the casing, the flap or vane will hang vertically downwards as shown in Figure 1, so as to substantially block the fluid passage through the casing. When however, fluid is flowing through the casing, the fluid will impinge on the flap or vane 19 which will be thereby deflected or angularly displaced about the axis of the pointed pivot pins 23. Such deflection of the flap or vane will cause a gyratory movement of the block 26 as described above, and this movement will be transmitted to the operating rod 34, the upper end of which will receive a substantially axial movement, or at least a movement having an axial component. The eccentric relationship of the pointed pivot pins 23 and the pointed portions 25 of the pivot pins 20 is clearly shown in Figure 4, by means of the centre line 50 for the pointed pivot pins 23, and the centre line 51 for the pointed portions 25 of the pivot pins 20. Upon sufficient deflection of the flap or vane 19 and consequent movement of the operating rod 34, the engagement of the latter with the actuating member 41 causes the switch to be opened or closed according to the direction of movement. The point at which this occurs depends on the deflection of the flap or vane 19 and can be predetermined by adjusting the switch 40 by means of the screw 46. The device is so arranged that when the flap or vane has been displaced to a predetermined angle corresponding with a predetermined rate of flow of fluid through the casing, the switch 40 will be opened. If however, the flow of fluid shall fall below the predetermined rate, then the operating rod 34 will descend and allow the switch to be closed. The switch 40 may be interposed in any suitable electric circuit incorporating alarm or indicating devices, either visual or audible, as required, so that a warning will be given immediately the rate of flow of fluid through the casing falls below a predetermined rate.

The construction described above is intended for use in a horizontal section of conduit or portion of the fluid system. The device may however, be adapted for use with the fluid flowing vertically or at any other desired angle. For this purpose a spring 52, see Figure 4, may be mounted around one or each of the pivot pins 20, the spring having an arm 53 for engagement with the casing and another arm 54 for engagement with the flap or vane 19. If the fluid is flowing in an upward direction then the spring 52 will merely have to ensure that the flap or vane 19 does not remain in an upward position vertically above its pivot when not held in such a position by the flow of fluid. If the flow of fluid is in a downward direction, then the spring 52 will be made stronger so that it will serve to bias the flap or vane 19 towards its closed position against the action of the fluid flow through the casing.

It will be understood that instead of having the eccentric pointed portions 25 on the pivot pins 20, the block 26 may be adapted to engage with a crank mounted for movement with the flap or vane, or the operating rod 34 may be pivotally engaged with such a crank. Alternatively the operating rod 34 may be connected to a strap encircling an eccentric associated with the flap or vane. The construction illustrated in the drawings is the preferred construction because it reduces friction and is less liable to have its efficiency impaired by the action of fluid, for example water, flowing through the casing. In either case a flexible member such as the bellows shown in Figure 2 will be employed and this flexible member may be made of any material which is sufficiently flexible so as not to unduly impede the movements of the operating rod. The flexible member therefore serves to seal the opening through which the operating rod passes without the need for glands or the like which are undesirable on account of the friction that would be introduced and the liability to clogging by small particles or sediment from the fluid.

Although a preferred embodiment of the fluid flow indicator device has been illustrated and described herein, it is understood that the invention is not limited thereby but is susceptible to changes in form and detail within the scope of the appended claims.

I claim:

1. A fluid flow indicator device comprising a casing, a fluid inlet and a fluid outlet in said casing, a vane in said casing, pivot means for said vane whereby said vane is movable between a position directly in the fluid path and a position clear of said path, an aperture in said casing, a plunger extending through said aperture into said casing, flexible bellows means, means connecting one end of said bellows means to said plunger and means connecting the other end of said bellows means to said aperture whereby said aperture is sealed, eccentric connecting means between said vane and said plunger whereby movements of said vane will cause longitudinal movements of said plunger, and switch means outside said casing, said longitudinal movements of said plunger being effective to operate said switch.

2. A fluid flow indicator device comprising a casing, a fluid inlet and a fluid outlet in said casing, a vane in said casing, pivot means for said vane whereby said vane is movable between a position directly in the fluid path and a position clear of said path, an aperture in said casing, a movable switch operating member extending through said aperture into said casing, flexible bellows means connected between said switch operating member and said aperture and sealing the latter, a block secured to the inner end of said switch operating member for movement therewith, pivot pins secured to said vane for movement therewith, said pivot pins being eccentric relative to said pivot means, whereby movements of said vane will cause longitudinal movements of said switch operating member and also compressing and expanding movements of said bellows, and switch means adjacent to the outer end of said switch operating member for actuation by said longitudinal movements of said operating member.

3. A fluid flow indicator device comprising a casing, a fluid inlet and a fluid outlet in said casing, a vane in said casing, pivot means for said vane whereby said vane is movable between a position directly in the fluid path and a position clear of said path, an aperture in said casing, a plunger extending through said aperture into said casing, flexible bellows means, means connecting one end of said bellows to said plunger and means connecting the other end of said bellows to said aperture thereby sealing said aperture, eccentric connecting means between said vane and said plunger, switch means adjacent to the outer end of said plunger, said switch means being actuable by said plunger, a groove in said switch, pivot means for said switch whereby said switch is movable towards and away from said plunger, a rotatable member adjacent to said groove, and an eccentric member on said rotatable member, said eccentric member engaging in said groove to rock said switch about said pivot and thereby adjust said switch towards and away from said plunger.

4. A fluid flow indicator device as defined in claim 2, wherein the pivot means and pivot pins cooperate with a pair of lugs on said vane, a bore in each of said lugs, said bores being aligned with one another to receive said aligned pivot pins, one of said pivot pins being mounted for longitudinal sliding movements in each of said bores, means for locking said pivot pins in said bores, a point on the inner end of each said pivot pin, a recess in the outer end of each said pivot pin, said recesses being eccentric relatively to said points, and said pivot means including a second pair of pointed pivot pins, screw threads on said second pair of pivot pins, threaded apertured lugs on said casing, said second pair of pivot pins being threadedly engaged in said threaded apertures and having their pointed ends engaged in said recesses in the outer ends of said aligned pivot pins, said block having recesses in opposite sides thereof and said points on the inner ends of said aligned pivot pins engaging in said recesses in said block.

5. A fluid flow indicator device comprising a casing, a fluid inlet and a fluid outlet in said casing, a vane in said casing, a pair of lugs on said vane, a bore in each of said lugs, said bores being aligned with one another, a first pair of pivot pins, one of said pivot pins being mounted for longitudinal sliding movements in each of said bores, means for locking said pivot pins in said bores, a point on the inner end of each said pivot pin, a recess in the outer end of each said pivot pin, said recesses being eccentric relatively to said points, a second pair of pointer pivot pins, screw threads on said second pair of pivot pins, threaded apertured lugs on said casing, said second pair of pivot pins being threadedly engaged in said threaded apertures and having their pointed ends engaged in said recesses in the outer ends of said first pair of pivot pins whereby said vane is mounted for movement between a position directly in the fluid path and a position clear of said path, an aperture in said casing, a disc secured over said aperture, a central opening in said disc, a movable switch operating member extending through said central opening into said casing, flexible bellows enclosing the inner end of said switch operating member and connected thereto at one end, the other end of said bellows being connected to said disc surrounding said opening and sealing the latter, a member secured to the inner end of said switch operating member outside of said bellows for movement therewith and having recesses in its opposite sides wherein said points on the inner ends of said first pair of pivot pins engage, whereby movements of said vane will cause longitudinal movements of said switch operating member due to the eccentricity between said recesses and said points at the opposite ends of said first pair of pivot pins, said longitudinal movements of said switch operating member also causing compressing and expanding movements of said bellows, and switch means adjacent to the outer end of said switch operating member for actuation by said longitudinal movements of said operating member.

References Cited in the file of this patent

UNITED STATES PATENTS

| Number | Name | Date |
| --- | --- | --- |
| 2,001,168 | Turner | May 14, 1935 |
| 2,094,319 | Faust | Sept. 28, 1937 |
| 2,244,373 | Powers | June 3, 1941 |
| 2,276,100 | Scholin | Mar. 10, 1942 |
| 2,403,938 | Macan | July 16, 1946 |
| 2,428,565 | Guidosh | Oct. 7, 1947 |